(No Model.)
J. SINNAMON.
DEVICE FOR THROWING GEAR OUT OF CONNECTION.
No. 303,059. Patented Aug. 5, 1884.
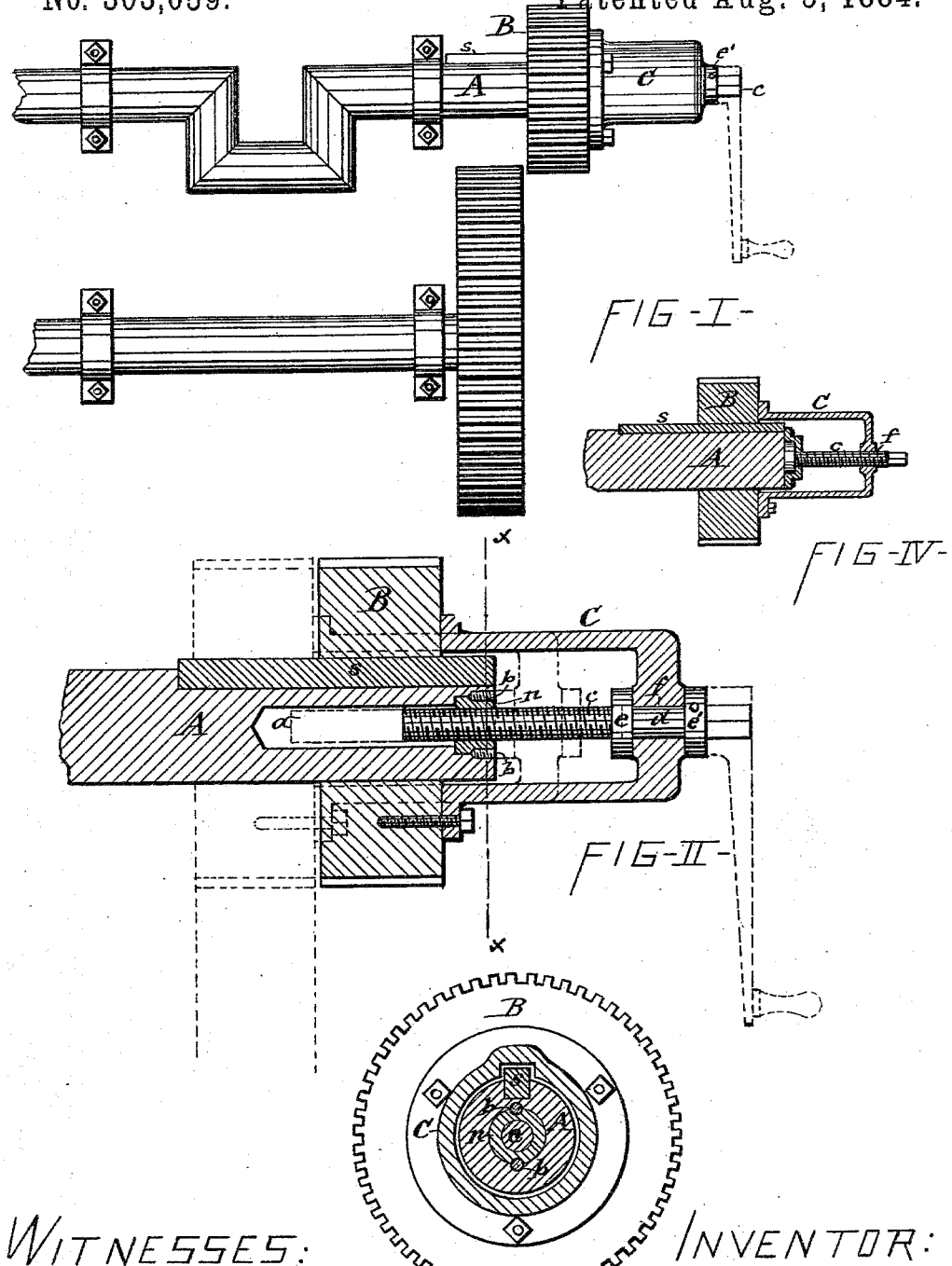

UNITED STATES PATENT OFFICE.

JOHN SINNAMON, OF OSWEGO, NEW YORK.

DEVICE FOR THROWING GEAR OUT OF CONNECTION.

SPECIFICATION forming part of Letters Patent No. 303,059, dated August 5, 1884.

Application filed June 20, 1884. (No model.)

*To all whom it may concern:*

Be it known that I, JOHN SINNAMON, of Oswego, in the county of Oswego, in the State of New York, have invented new and useful Improvements in Devices for Throwing Gears in and out of Connection, of which the following, taken in connection with the accompanying drawings, is a full, clear, and exact description.

This invention relates to devices designed, more particularly, for shifting heavy gear-wheels on their shaft, so as to throw said wheels in and out of connection with other gear-wheels from or to which they are to either partake or transmit motion.

The invention consists, chiefly, in the combination, with a shaft and a wheel sliding longitudinally on said shaft and confined circumferentially thereon, of a screw connected with said shaft and wheel, and arranged to move the wheel and maintain it in its required position, all as hereinafter more fully described, and specifically set forth in the claims.

In the accompanying drawings, Figure I is a view showing a slip-gear or shifting-gear thrown out of connection with a co-operating-gear by means of my invention. Fig. II is an enlarged longitudinal section of my invention. Fig. III is a transverse section on line $x\ x$, Fig. II; and Fig. IV illustrates modifications of my invention.

Similar letters of reference indicate correspondings parts.

A denotes the shaft, and B the wheel sliding on said shaft, and confined circumferentially thereon, so as to rotate therewith. The connection of said parts may be in any of the well-known ways, and is here represented in the form of a feather or spline, $s$, on the shaft, and a corresponding groove in the axial bearing of the wheel. In the end of the shaft is an axial channel, $a$, in which is secured a nut, $n$, which is countersunk in the end of the shaft and retained in position by means of screws $b\ b$, inserted in the joint between the nut and shaft, as illustrated in Figs. II and III of the drawings. In said nut works a screw, $c$, which projects from the end of the shaft, and has its outer or free end squared for the application of a wrench. Back of this squared end the screw $c$ has a smooth portion, $d$, and collars $e$ and $e'$ at the ends of said smooth portion. The outer collar, $e'$, is removable, to admit of slipping onto the screw a coupling or cap, C, which is firmly secured to the side of the wheel B, and extended across the end of the shaft A, and provided with an eye, $f$, for the reception of the screw $c$, the smooth portion $d$ of which is fitted to the eye $f$, and the collars $e\ e'$ confine the coupling or cap C longitudinally on the screw, so as to compel said coupling to travel with the screw toward and from the end of the shaft.

It will be observed that the described screw-connection between the wheel and shaft serves to securely hold the wheel in its desired position, and by turning the screw $c$ the wheel B is shifted on the shaft and moved into or out of connection with the co-operating wheel in a very convenient and expeditious manner. By the employment of the cap C the screw $c$ and nut $n$ are effectually housed and protected from dust.

I do not limit myself to the before-described arrangement of parts, as the same is susceptible of several modifications, one of which is illustrated in Fig. IV of the drawings, in which instance the screw $c$ is journaled on the end of the shaft, and has its threaded portion working in the eye $f$ of the cap C, which is screw-threaded, corresponding to and performs the function of the nut. The screw is thus confined longitudinally, and the cap moves endwise on the screw.

Having described my invention, what I claim as new, and desire to secure by Letters Patent, is—

1. The combination, with a shaft and a wheel sliding longitudinally on said shaft and confined circumferentially thereon, of a screw connected with said shaft and wheel, and arranged to move the wheel and maintain it in the required position, substantially as set forth.

2. The combination, with a shaft and a wheel sliding longitudinally on said shaft and confined circumferentially thereon, of a screw extended from the end of the shaft and parallel therewith, and a coupling affixed to the wheel and connected with the screw to be moved thereby, substantially as and for the purpose set forth.

3. The combination, with a shaft and a wheel sliding longitudinally on said shaft and confined circumferentially thereon, of a screw working axially in the end of the shaft, and a coupling affixed to the wheel and extended across the end of the shaft, and provided with an eye for the reception of the outer end of the screw, and confined longitudinally on said screw, substantially as described and shown.

4. The combination, with a shaft and a wheel sliding on said shaft and confined circumferentially thereon, of an axial chamber in the end of the shaft, a nut secured in said channel, a screw working in said nut, and having its outer end squared for the reception of a wrench, a cap secured to the side of the wheel, and extended across the end of the shaft, and provided with an eye for the reception of the end of the screw, and collars secured to the screw, respectively at the inner and outer sides of the cap, all constructed and combined substantially in the manner specified and shown.

In testimony whereof I have hereunto signed my name and affixed my seal, in the presence of two attesting witnesses, at Syracuse, in the county of Onondaga, in the State of New York, this 5th day of June, 1884.

JOHN SINNAMON. [L. S.]

Witnesses:
F. H. GIBBS,
C. BENDIXON.